United States Patent [19]
Cummins et al.

[11] Patent Number: 5,605,708
[45] Date of Patent: Feb. 25, 1997

[54] ROUNDER APPARATUS FOR PROCESSING BAKERY DOUGH

[75] Inventors: Chris Cummins, Mechanicsville; Sam Seiling, Richmond, both of Va.

[73] Assignee: Cummins Eagle, Inc., Ashland, Va.

[21] Appl. No.: 524,976

[22] Filed: Sep. 11, 1995

[51] Int. Cl.⁶ .................................................. A21C 11/00
[52] U.S. Cl. ...................... 425/332; 425/364 R
[58] Field of Search ............................. 425/332, 333, 425/364 R, 334; 426/496, 512

[56]  References Cited

U.S. PATENT DOCUMENTS

| | | | |
|---|---|---|---|
| 936,660 | 10/1909 | Petri | 425/332 |
| 1,601,781 | 10/1926 | Van Houten | 425/332 |
| 1,895,634 | 1/1933 | Lauterbur et al. | 425/364 R |
| 2,858,775 | 11/1958 | Marasso | 425/332 |
| 3,311,068 | 3/1967 | Atwood et al. | 425/332 |
| 3,377,965 | 4/1968 | Atwood | 425/364 R |
| 4,008,025 | 2/1977 | Campbell | 425/332 |
| 4,124,305 | 11/1978 | Benier | 425/332 |
| 4,306,850 | 12/1981 | Cummins | 425/332 |

FOREIGN PATENT DOCUMENTS

| | | | |
|---|---|---|---|
| 2455997 | 6/1976 | Germany | 425/364 R |
| 2501974 | 7/1976 | Germany | 425/364 R |

Primary Examiner—Robert Davis
Attorney, Agent, or Firm—Norman B. Rainer

[57]  ABSTRACT

An apparatus for rounding the sequential pieces of bakery dough dispensed by a dough handling machine employs upper and lower advancing assemblies. Each assembly has an endless flat conveyor belt. Both belts move in opposite directions, and are dimensioned such that the pieces of dough fall off the extremity of the upper belt onto the lower belt. Stationary vanes on the top surfaces of the belts contact the pieces of dough to cause rounding thereof.

12 Claims, 2 Drawing Sheets

ROUNDER APPARATUS FOR PROCESSING BAKERY DOUGH

BACKGROUND OF THE INVENTION

1. Field of the Invention

This invention relates to the handling of dough for baking, and more particularly concerns apparatus for dispensing successive pieces of dough of uniform shape.

2. Description of the Prior Art

Methods and apparatus for pumping, homogenizing and dividing dough into pieces of predetermined uniform weight for baking into bread loaves, buns, rolls and the like are disclosed in U.S. Pat. Nos. 4,960,601; 4,517,212; 4,449,908; 4,424,236; 4,332,538; 4,948,611; and 5,046,940. In general, such apparatus includes a hopper which receives dough, auger means for advancing the dough, metering means which control the advance of the dough, multiple nozzles which receive the metered dough, and cutting means which sever the continuously advancing dough into discrete pieces that fall onto an underlying moving belt.

The number of pieces of dough that fall onto the belt in laterally spaced array usually corresponds to the number of nozzles. However, in some instances a positioner device may be utilized to distribute pieces of dough emergent from a single nozzle onto different positions transverse to the direction of belt travel. Therefore, the number of drop points at which pieces of dough fall onto the belt in lateral array may be greater than the number of nozzles. The several laterally spaced pieces of dough, in longitudinal sequence, constitute lines of dough pieces.

The pieces of dough on the moving belt are generally subjected to a shaping treatment which rounds the pieces. The rounding is usually produced by elongated stationary vanes extending upwardly from the belt surface and oriented on a bias relative to the direction of belt movement. The vanes are of arcuate shape and produce a curling effect as the piece of dough is propelled by the belt in rolling contact with the vane. Although such dough shaping apparatus, generally referred to as a "rounder" is very effective, it requires considerable floor space in the building which houses the dough handling equipment.

It is accordingly the object of the present invention to provide a rounder apparatus which occupies relatively little floor space.

It is another object of this invention to provide a rounder apparatus as in the foregoing object which is easily serviceable for maintenance and cleaning purposes.

It is a still further object of the present invention to provide a rounder of the aforesaid nature of durable construction amenable to low cost manufacture.

These objects and other objects and advantages of the invention will be apparent from the following description.

SUMMARY OF THE INVENTION

The above and other beneficial objects and advantages are accomplished in accordance with the present invention by a rounder apparatus adapted for use with a dough handling machine that dispenses through one or more nozzles at one or more laterally spaced drop points sequential pieces of dough of substantially constant weight, said apparatus comprising:

1) upper and lower advancing assemblies, each assembly comprised of:

a) an endless flat conveyor belt driven horizontally between proximal and distal rollers which define the longitudinal travel length of the belt and cause the belt to have oppositely moving top and bottom surfaces, said belt having a lateral width defined by opposed straight edges, said proximal roller adapted to be positioned below and longitudinally adjacent said nozzle, and b) at least one elongated stationary rounding vane disposed above said top surface in close adjacency therewith and disposed in angled relationship to the direction of belt travel, said vane having a substantially uniform arcuate surface directed toward one edge of said belt, the number of vanes corresponding to the number of drop points, 2) said upper assembly being positioned above said lower assembly in a manner such that the belts are in substantially parallel disposition with the edges of both belts in vertical alignment, and the distal roller of the lower assembly extends longitudinally beyond the distal roller of the upper assembly in the direction opposite to said proximal extremities, 3) the direction of movement of the top surface of the belt of said upper assembly being from the proximal to the distal rollers, and the direction of movement of the top surface of the belt of the lower assembly being from the distal to the proximal rollers, 4) the angled relationship of the vanes of the upper assembly being opposite to the direction of angled relationship of the vanes of the lower assembly, 5) the arcuate surfaces of the vanes of the upper assembly facing in a direction opposite to the direction faced by the arcuate surfaces of the vanes of the lower assembly, whereby 6) pieces of dough which fall onto the top surface of the belt of said upper assembly are transported laterally and longitudinally in contact with said arcuate surfaces and drop from the distal roll extremity onto the top surface of the belt of said lower assembly which transports the pieces in opposite lateral and longitudinal directions.

In preferred embodiments, the upper and lower assemblies are secured by a framework, and the upper assembly can be moved away from said lower assembly.

BRIEF DESCRIPTION OF THE DRAWING

For a fuller understanding of the nature and objects of the invention, reference should be had to the following detailed description taken in connection with the accompanying drawing forming a part of this specification and in which similar numerals of reference indicate corresponding parts in all of the figures of the drawing.

DESCRIPTION OF THE PREFERRED EMBODIMENT

Figure 3:
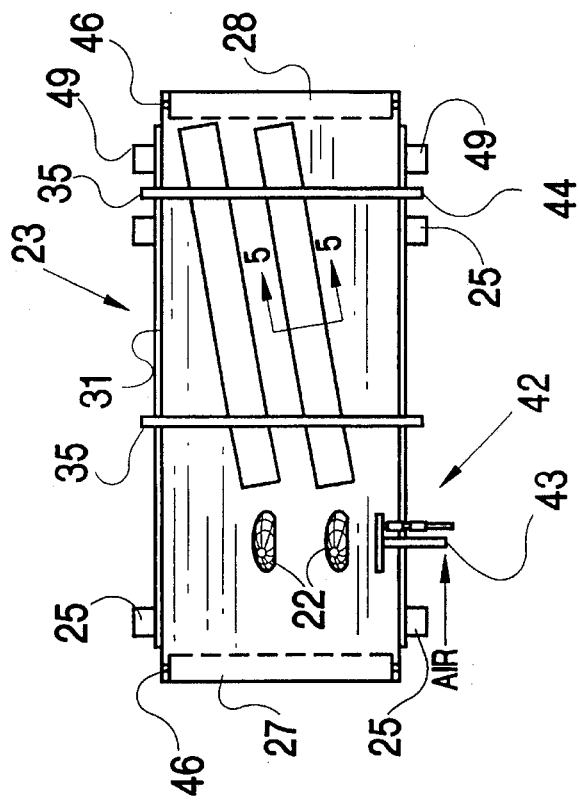
FIG. 3 is an enlarged sectional view taken in the direction of the arrows upon the line 3—3 of FIG. 1.

Referring to FIGS. 1–5, an embodiment of the rounder apparatus 10 of the present invention is shown in operative association with a dough handling machine 11. Said dough handling machine is comprised of hopper 12 disposed above a housing block 13 that contains auger means 14 driven by motor 15, for advancing bakery dough entered into said hopper. A metering pump 16 driven by motor 17 forwards dough into a conduit 18 that terminates in nozzle 19. A reciprocating cutting mechanism 20, driven by motor 21, accurately severs the stream of dough into pieces 22 of uniform weight. As best shown in FIG. 3, a positioning device 42, employing a pneumatic ram 43 and located below nozzle 19, laterally displaces every alternate pieces of dough.

The rounder apparatus 10 is comprised of upper and lower advancing assemblies 23 and 24, respectively, positioned one above the other by framework 25. Each advancing assembly is comprised of an endless flat conveyor belt 26 driven horizontally between proximal and distal rollers 27 and 28, respectively, which define the longitudinal travel length of the belt and cause the belt to have oppositely moving top and bottom surfaces 29 and 30, respectively. The rollers are rotatively mounted on axles 46 joined to opposed elongated side plates 44 which are secured by brace members 45 that extend upwardly and transversely across the belt. In the exemplified embodiment, the distal roller of the upper belt and the proximal roller of the lower belt are driven by pulley bands 47 interactive with motors 48. The conveyor belts have laterally extending widths defined by opposed straight edges 31. Proximal roller 27 is adapted to be positioned below and longitudinally adjacent nozzle 19 of said dough handling machine. A downwardly directed deflector 36 may be associated with the distal roller of the belt of upper assembly 23.

The upper assembly is displaceable with respect to the lower assembly to facilitate cleaning and maintenance of the rounder apparatus. Said displacement is achieved by vertical support posts 49 attached to side plates 44 and mounted upon casters 50 for rolling motion upon floor 51. The side plates 44 associated with the upper belt are further supported for sliding contact upon lateral guide bar 52 secured to framework 25. Stabilizing guide tabs 53, shown in FIG. 2, attached to the upper portion of guide bar 52 slidably embrace the lowermost edges of side plates 44.

At least one elongated stationary rounding vane 32 is disposed above the top surface of each belt in close adjacency therewith. The vanes have a flat upper mounting surface 33, a straight lower edge 34, and an arcuate surface 37 extending between said mounting surface and lower edge. Said upper mounting surfaces are engaged by the transverse portions of brace members 45. The lower edges 34 are preferably disposed in sliding contact with the top surface of the belt. The number of vanes correspond to the number of drop points or lines of dough produced by said dough handling machine.

Figure 4:
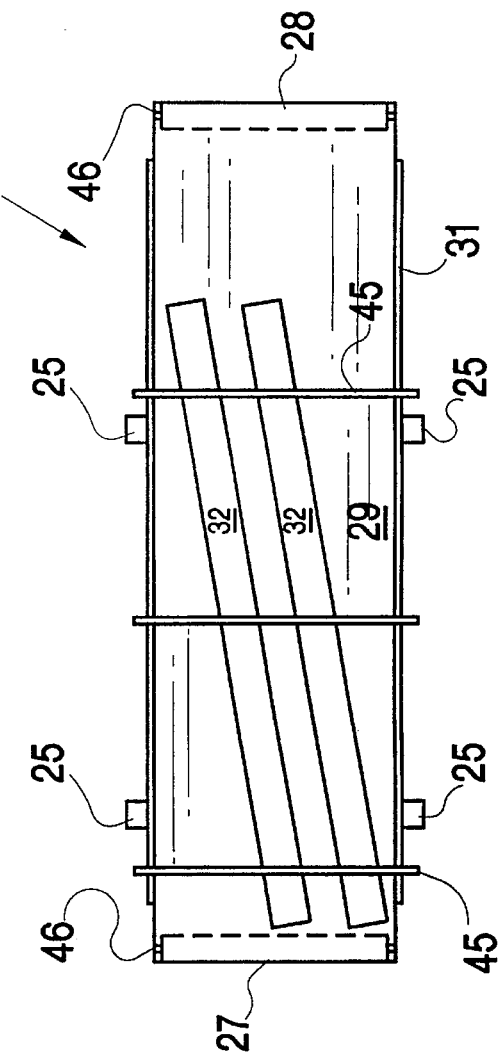
FIG. 4 is an enlarged sectional view taken in the direction of the arrows upon the line 4—4 of FIG. 1.
Figure 5:
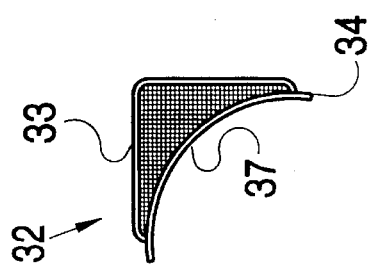
FIG. 5 is an enlarged sectional view of an embodiment of the vane component of the rounder apparatus of this invention.

As best shown in FIGS. 3 and 4, the vanes are parallel to each other and disposed in angled relationship to the direction of belt travel. The arcuate surfaces of vanes associated with a given belt all face toward the same edge of the belt. However, the arcuate surfaces of the vanes of the upper assembly face in a direction opposite to the facing direction of the arcuate surfaces of the vanes of the lower assembly. The vanes associated with one belt are in vertical alignment with the vanes of the other belt. In a preferred vane construction, as shown in FIG. 5, arcuate surface 37 is a sheet of Teflon (polytetrafluoroethylene), and is secured to the two extremities of an angled bracket.

Upper advancing assembly 23 is positioned above lower advancing assembly 24 in a manner such that the belts are in substantially parallel disposition with the edges of both belts in vertical alignment. The distal roller 28 of lower assembly 24 extends longitudinally beyond the distal roller of the upper assembly in the direction opposite to said proximal extremities.

Figure 1:
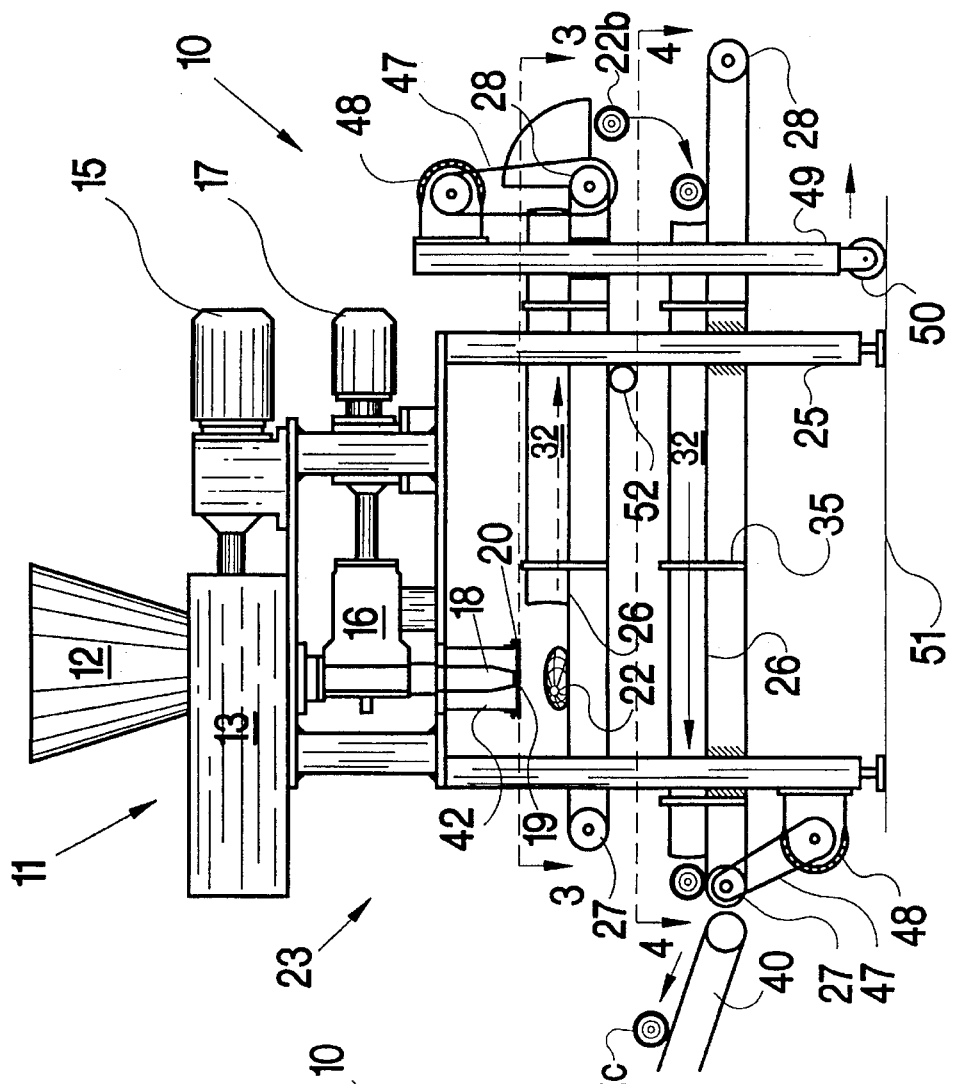
FIG. 1 is a side view of an embodiment of the rounder apparatus of the present invention shown in operational association with a dough handling machine.
Figure 2:
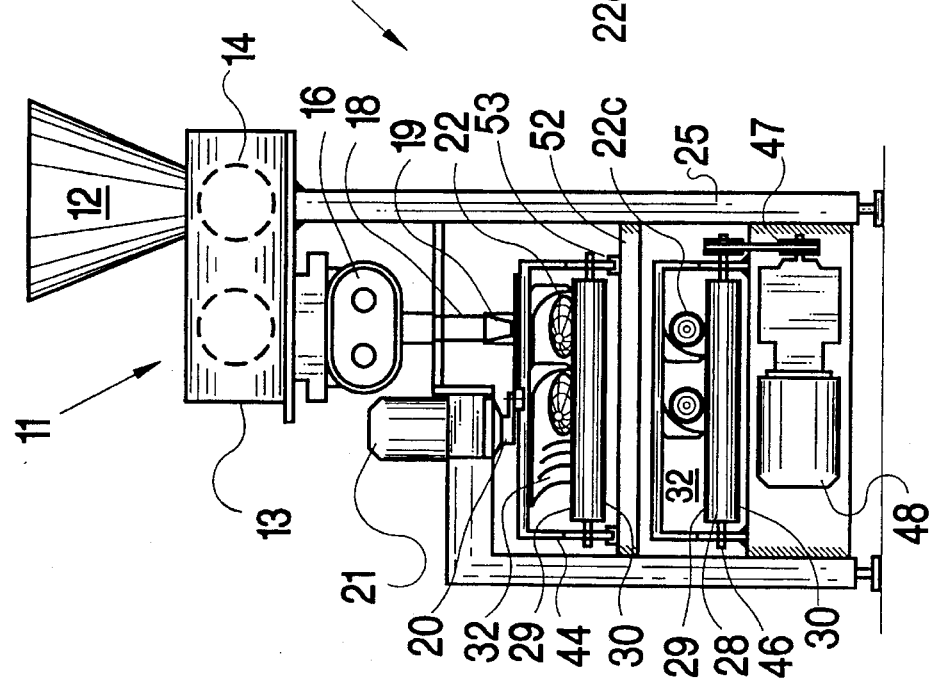
FIG. 2 is a front end view of the apparatus in FIG. 1.

The direction of movement of the top surface of the belt of said upper assembly is from the proximal to the distal rollers, as shown by the arrowed lines in FIGS. 1 and 3. The direction of movement of the top surface of the belt of the lower assembly is from the distal to the proximal rollers, as shown by the arrowed lines in FIGS. 1 and 4.

The angled relationship of the vanes of the upper assembly is opposite to the direction of angled relationship of the vanes of the lower assembly, as shown in FIGS. 3 and 4.

By virtue of the aforesaid components and their specialized interactions, pieces of dough which fall from said nozzles onto the top surface of the belt of said upper assembly are transported laterally and longitudinally in contact with said arcuate surfaces and drop from the proximal roll extremity onto the top surface of the belt of said lower assembly which transports the pieces in opposite lateral and longitudinal directions.

In the drawings, the initially deposited pieces of dough 22 are shown having a non-round appearance. The partially rounded pieces which fall from the distal roller of the upper belt, are designated 22b. The fully rounded pieces are designated 22c, and are shaded differently than pieces 22b. The effect of such dough handling is to cause the sequential pieces of dough to have a rounded shape by the time they transfer from the proximal roll extremity of the lower belt onto a subsequent conveyor belt 40. Accordingly, the rounder apparatus of the present invention provides a function similar to prior art practices while occupying only about 50% of the floor space required by conventional rounder apparatus.

While particular examples of the present invention have been shown and described, it is apparent that changes and modifications may be made therein without departing from the invention in its broadest aspects. The aim of the appended claims, therefore, is to cover all such changes and modifications as fall within the true spirit and scope of the invention.

Having thus described our invention, what is claimed is:

1. A rounder apparatus adapted for use with a dough handling machine that dispenses through one or more nozzles at one or more laterally spaced drop points sequential pieces of dough of substantially constant weight, said apparatus comprising:

a) upper and lower advancing assemblies, each assembly comprised of:
1) an endless flat conveyor belt driven horizontally between proximal and distal rollers which define the longitudinal travel length of the belt and cause the belt to have oppositely moving top and bottom surfaces, said belt having a lateral width defined by opposed straight edges, said proximal roller adapted to be positioned below and longitudinally adjacent said nozzle, and
2) at least one elongated stationary rounding vane disposed above said top surface in close adjacency therewith and disposed in angled relationship to the direction of belt travel, said vane having a substantially uniform arcuate surface directed toward an edge of said belt, the number of vanes corresponding to the number of drop points, b) said upper assembly being positioned above said lower assembly in a manner such that the belts are in substantially parallel disposition with the edges of both belts in vertical alignment, and the distal roller of the lower assembly extends longitudinally beyond the distal roller of the upper assembly in the direction opposite to said proximal extremities, c) the direction of movement of the top surface of the belt of said upper assembly being from the proximal to the distal rollers, and the direction of movement of the top surface of the belt of the lower assembly being from the distal to the proximal rollers, d) the angled relationship of the vanes of the upper assembly being opposite to the direction of angled relationship of the vanes of the lower assembly, e) the arcuate surfaces of the vanes of the upper assembly facing in a direction opposite to the direction faced by the arcuate surfaces of the vanes of the lower assembly, whereby f) pieces of dough which fall onto the top surface of the belt of said upper assembly are transported laterally and longitudinally in contact with said arcuate surfaces and drop from the distal roll extremity onto the top surface of the belt of said lower assembly which transports the pieces in opposite lateral and longitudinal directions.

2. The rounder apparatus of claim 1 wherein said upper and lower advancing assemblies are disposed within a framework that permits longitudinal transport of said upper assembly away from said lower assembly.

3. The rounder apparatus of claim 1 wherein a downwardly directed deflector is associated with the distal roller of the belt of said upper assembly.

4. The rounder apparatus of claim 1 wherein the distal roller of said upper belt and the proximal roller of said lower belt are motor driven.

5. The rounder apparatus of claim 1 wherein vertically oriented elongated side plates extend between said rollers in close adjacency to the edges of said belts.

6. The rounder apparatus of claim 5 wherein said rollers are rotatively secured by said side plates.

7. The rounder apparatus of claim 6 wherein said side plates are secured by brace members that extend upwardly from said plates and transversely across said belt.

8. The rounder apparatus of claim 7 wherein said vanes have a flat upper mounting surface that is held by said brace members.

9. The rounder apparatus of claim 1 further provided with a positioning device that laterally displaces alternate pieces of dough falling onto said upper belt.

10. The rounder apparatus of claim 5 wherein said side plates slidably support said upper assembly in said framework.

11. The rounder apparatus of claim 1 wherein said vanes are in frictional contact with said belt.

12. The rounder apparatus of claim 1 wherein the vanes of a given belt are in parallel lateral disposition and the vanes of the upper belt are in vertical alignment with the vanes of the lower belt and in parallel relationship therewith.

* * * * *